(12) United States Patent
Nash et al.

(10) Patent No.: US 9,518,807 B2
(45) Date of Patent: Dec. 13, 2016

(54) PROJECTILE CONTROL SYSTEMS AND METHODS

(71) Applicant: Rosemount Aerospace Inc., Burnsville, MN (US)

(72) Inventors: Gregory Nash, Shakopee, MN (US); Gary Willenbring, Waconia, MN (US); Robert L. Alford, Excelsior, MN (US)

(73) Assignee: Rosemount Aerospace Inc., Burnsville, MN (US)

(*) Notice: Subject to any disclaimer, the term of this patent is extended or adjusted under 35 U.S.C. 154(b) by 127 days.

(21) Appl. No.: 14/333,088

(22) Filed: Jul. 16, 2014

(65) Prior Publication Data

US 2016/0018202 A1    Jan. 21, 2016

(51) Int. Cl.

| F42B 15/01 | (2006.01) |
| F42B 10/62 | (2006.01) |
| G05D 1/08 | (2006.01) |
| G05D 1/10 | (2006.01) |
| F42B 15/00 | (2006.01) |
| F42B 10/00 | (2006.01) |

(52) U.S. Cl.
CPC ............. *F42B 15/01* (2013.01); *F42B 10/62* (2013.01); *G05D 1/0816* (2013.01); *G05D 1/107* (2013.01)

(58) Field of Classification Search
CPC .......... F42B 15/01; F42B 10/60; F42B 10/62; F42C 15/40; B64G 1/22; B64G 1/24; B64G 1/26; B64G 1/28; B64G 1/281; F41G 3/14; F41G 3/145; F41G 7/001; F41G 7/20; F41G 7/22; F41G 7/2206; F41G 7/2213; F41G 7/30; F41G 7/301; F41G 7/303; F41G 7/305; F41G 7/34; G05D 1/08; G05D 1/0808; G05D 1/0816; G05D 1/10; G05D 1/107; G05D 1/108

USPC ..................................... 244/3.1–3.3
See application file for complete search history.

(56) References Cited

U.S. PATENT DOCUMENTS

| 3,416,752 A | * | 12/1968 | Hembree | .............. F41G 7/2213 |
| | | | | 244/3.17 |
| 3,471,105 A | * | 10/1969 | Chang | ..................... B64G 1/28 |
| | | | | 244/3.21 |
| 3,558,078 A | * | 1/1971 | Lanzaro | ................. B64G 1/281 |
| | | | | 244/3.18 |
| 3,567,163 A | * | 3/1971 | Kepp | ...................... F41G 7/303 |
| | | | | 244/3.14 |

(Continued)

OTHER PUBLICATIONS

Extended European Search Report dated May 20, 2016, issued during the prosecution of corresponding European Patent Application No. 15173412.6. (5 pages).

*Primary Examiner* — Bernarr Gregory
(74) *Attorney, Agent, or Firm* — Locke Lord LLP; Scott D. Wofsy; Alicia J. Carroll

(57) ABSTRACT

A method of controlling a projectile includes initiating an execution mode if a roll control authority parameter is outside of a pre-determined operating range for a projectile. The execution mode includes bypassing a guidance command and sending a modified command to execute a coning maneuver to improve control response of the projectile. A projectile control system includes a processor operatively connected to a memory. The memory has instructions recorded thereon that, when read by the processor, cause the processor to execute the method operations described above.

13 Claims, 4 Drawing Sheets

(56) References Cited

U.S. PATENT DOCUMENTS

| | | | | |
|---|---|---|---|---|
| 3,643,897 A | * | 2/1972 | Johnson, Jr. | B64G 1/26 |
| | | | | 244/3.22 |
| 3,937,423 A | * | 2/1976 | Johansen | B64G 1/26 |
| | | | | 244/3.22 |
| 5,259,569 A | | 11/1993 | Waymeyer et al. | |
| 5,886,286 A | * | 3/1999 | Will | F42C 15/40 |
| | | | | 244/3.2 |
| 5,938,148 A | * | 8/1999 | Orenstein | F41G 7/2206 |
| | | | | 244/3.15 |
| 6,293,488 B1 | * | 9/2001 | Wells | F41G 7/303 |
| | | | | 244/3.11 |
| 6,596,976 B2 | * | 7/2003 | Lin | F41G 3/145 |
| | | | | 244/3.15 |
| 7,350,744 B1 | * | 4/2008 | Schwartz | F42B 15/01 |
| | | | | 244/3.1 |
| 7,989,742 B2 | * | 8/2011 | Bredy | F41G 7/34 |
| | | | | 244/3.1 |
| 2010/0176238 A1 | | 7/2010 | Alford | |
| 2012/0154201 A1 | | 6/2012 | Frey, Jr. | |

\* cited by examiner

PROJECTILE CONTROL SYSTEMS AND METHODS

STATEMENT REGARDING FEDERALLY SPONSORED RESEARCH OR DEVELOPMENT

This invention was made with government support under prime contract number N0002-05-C-5117 and sub-contract number 88MMYZ008 awarded by the U.S. Navy. The government has certain rights in the invention.

BACKGROUND OF THE INVENTION

1. Field of the Invention

The present disclosure relates to projectiles, and more particularly to roll control authority of projectiles.

2. Description of Related Art

A form of traditional projectiles has movable control surfaces placed forward of a set of tail fins. The control surfaces of the projectile can exhibit low roll control authority when the flow field from the deflected control surfaces induces opposing roll moments on the tail fins. This inducement is generally more prevalent at low total angle of attack and may vary across Mach number regions. The extent of the interference can depend upon the overall projectile airframe design. This interference is typically addressed through design changes to the structure of a projectile, for example, physically adjusting one or more components associated with the projectile.

Such conventional methods and systems have generally been considered satisfactory for their intended purpose. However, there is still a need in the art for improved methods and systems for controlling a projectile. The present disclosure provides a solution for this need.

SUMMARY OF THE INVENTION

A method of controlling a projectile includes initiating an execution mode if a roll control authority parameter is outside of a pre-determined operating range for a projectile. The execution mode includes bypassing a guidance command and sending a modified command to execute a coning maneuver to improve control response of the projectile.

In accordance with certain embodiments, determining if the roll control authority parameter is outside of the pre-determined operating range can include monitoring a speed, for example, Mach number, and a total angle of attack of the projectile and initiating a monitoring mode if both the speed and the total angle of attack are outside of respective pre-determined ranges. The monitoring mode can include monitoring of a roll-deflection command to determine if the roll-deflection command is outside of a pre-determined roll-deflection command range. If the roll-deflection command is outside of the pre-determined roll-deflection command range then the roll control authority parameter can be outside of the operating range.

It is contemplated that the modified command can include a coning acceleration command and/or can include an asymmetric biasing command for providing steering capabilities during the coning maneuver. The asymmetric biasing command can include commanding cyclic movement of at least one control surface of the projectile. Execution of the coning maneuver can include moving at least one control surface of the projectile to change the total angle of attack of the projectile.

The method can also include exiting the execution mode if a pre-determined exit parameter is met. Exiting the execution mode can include cancelling the modified command and returning to the guidance command. The method can include determining if at least one of a total angle of attack and a speed, e.g. Mach number, is within a respective pre-determined range. If at least one of the total angle of attack and the speed is within its respective pre-determined range, then the pre-determined exit parameter is met. The method can also include determining if a terminal performance parameter, e.g. time-to-impact for the projectile, is less than or equal to a pre-determined terminal performance parameter threshold. If the terminal performance parameter is less than or equal to the pre-determined terminal performance parameter threshold then the pre-determined exit parameter is met.

A projectile control system includes a processor operatively connected to a memory. The memory has instructions recorded thereon that, when read by the processor, cause the processor to initiate the execution mode if the roll control authority parameter is outside of the pre-determined operating range. The projectile control system can also include a projectile operatively connected to the processor, wherein the projectile includes at least one control surface configured to rotate about its respective control surface axis to generate control forces and moments.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
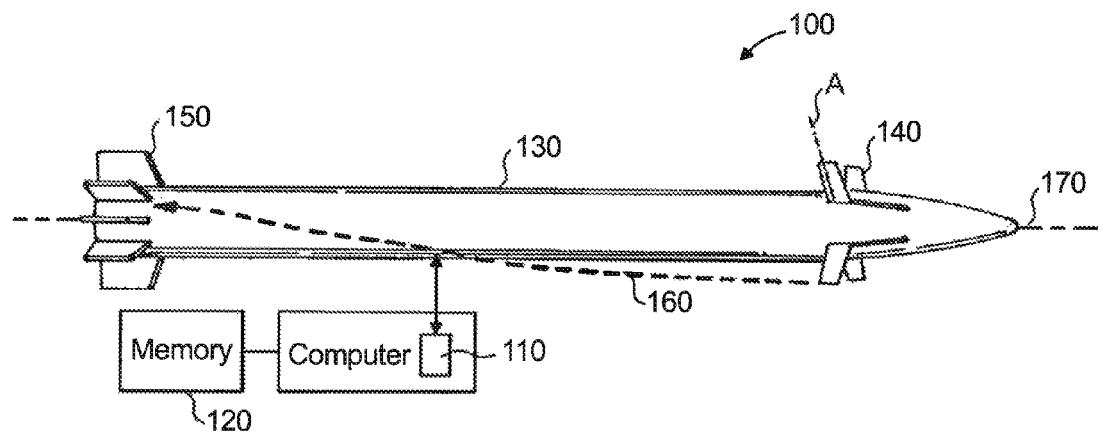
FIG. 1 is a schematic plan view of an exemplary embodiment of a projectile control system constructed in accordance with the present disclosure, showing a projectile with tail fins and forward control surfaces, a memory and a processor.

Reference will now be made to the drawings wherein like reference numerals identify similar structural features or aspects of the subject disclosure. For purposes of explanation and illustration, and not limitation, a partial view of an exemplary embodiment of a control system in accordance with the disclosure is shown in FIG. 1 and is designated generally by reference character 100. Other embodiments of systems and methods of controlling a forward control surface in accordance with the disclosure, or aspects thereof, are provided in FIGS. 2-7, as will be described.

As shown in FIG. 1, a projectile control system 100 includes a processor 110 operatively connected to a memory 120 and a projectile 130, and is configured and adapted to undertake the operations described below. Projectile 130 includes a plurality of control surfaces 140, e.g. all-moving fins and fixed lifting surfaces with hinged control surfaces, configured to rotate about their respective deflection axes A to generate control forces and moments. Projectile 130 also includes a plurality of tail fins 150. A dashed line schematically indicates a wake 160 trailing from control surface 140 that impinges tail fin 150 of the projectile, reducing roll control authority about a projectile roll axis 170, as described below.

Those skilled in the art will readily appreciate that while processor 110 and memory 120 are shown external to projectile 130, processor 110 and memory 120 can be disposed within projectile 130. It is also contemplated that memory 120 and processor 110 can be physically displaced from one another and/or from projectile 130, e.g. they can be in wireless communication with one another. For example, memory 120 and processor 110 can be on an aircraft and processor 110 can be configured to send wireless signals to projectile 130 and receive wireless signals from projectile 130. In addition, it is contemplated that signals from processor 110 to projectile 130, and vice versa, can be sent through an intermediary, such as a satellite or the like.

Those skilled in the art will readily appreciate that processor 110 may be any one of numerous known general purpose processors or an application specific processor that operates in response to program instructions. Processor 110 can comprise more than one distinct processing device, for example to handle different functions, e.g. different operations of the method described below. It is also contemplated that memory 120 can be any form of memory device, for example, volatile or non-volatile memory, solid state storage device, magnetic device, or the like. It will be appreciated that memory 120 may include either, or both, RAM (random access memory) and ROM (read only memory). It will be further appreciated that memory 120 could be integrally formed as part of processor 110.

Figure 2:
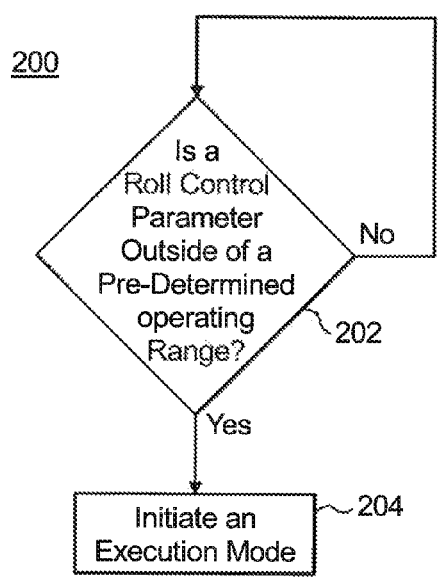
FIG. 2 is a flowchart of an exemplary method for controlling a projectile in accordance with the invention, showing operations for initiating an execution mode.

With reference to FIG. 2, a method 200 of controlling a projectile, e.g. projectile 130, includes operations 202 and 204. Operation 202 includes determining if a roll control authority parameter is outside of a pre-determined roll control operating range for projectile 130. If so, processor 110 begins operation 204. If not, processor 110 continues to perform operation 202. Operation 204 includes initiating an execution mode.

Figure 3:
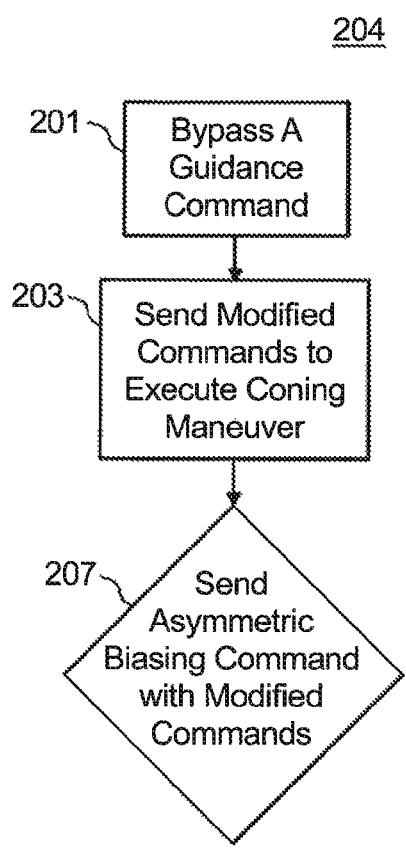
FIG. 3 is a flowchart of another aspect of controlling a projectile in accordance with the invention, showing operations of the execution mode.
Figure 7:
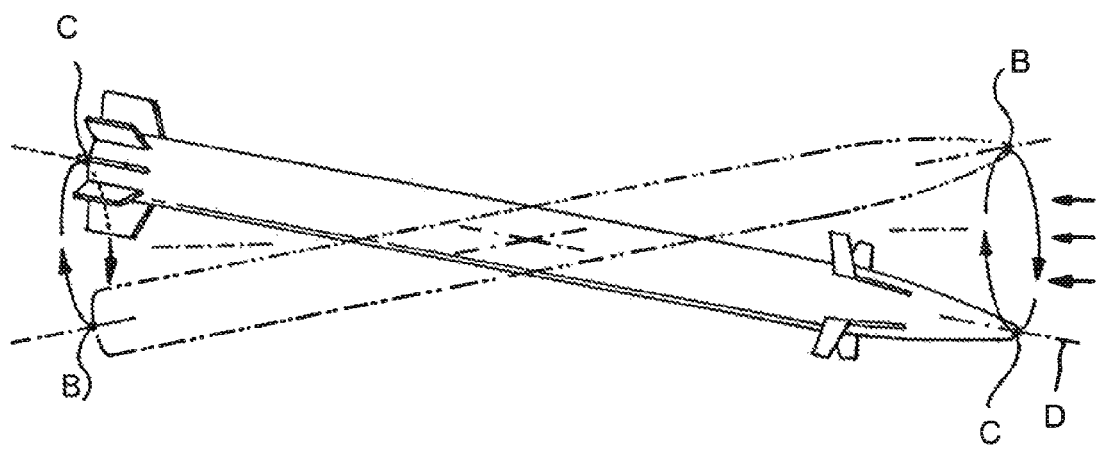
FIG. 7 is schematic view if the projectile shown in FIG. 1 executing a coning maneuver.

As shown in FIG. 3, the execution mode includes operations 201, 203, and 207. Operation 201 bypasses a guidance command and operation 203 sends a modified command to control surfaces 140 to execute a coning maneuver for better controlling projectile 130. With reference now to FIG. 7, a schematic depiction of the coning maneuver is shown. Projectile 130 rotates about its own axis D and about a point E, such that a cone shape is created as axis D rotates with respect to point E in a cyclic manner. The cone shape is schematically illustrated by the dashed lines between points B and points C.

This allows a wake created by a control surface, e.g. control surface 140, to avoid or more fully avoid from tail fins, e.g. tail fins 150, while still maintaining a controlled trajectory with no unintended course change due to the maneuver. The modified command includes incorporating an asymmetric biasing command for providing steering capabilities during the coning maneuver, as shown in operation 207.

The modified command, described above with respect to operation 203 includes a coning acceleration command. The coning acceleration command is represented by acceleration (m/sec$^2$) in the Y and Z planes, $A_{Y\_Coning}$ and $A_{Z\_Coning}$, respectively, and is governed by the following equations:

$$A_{Y\_Coning} = A_{Cyclic} \cos(\omega_{Coning} t + \phi_o) + A_{Bias}$$

and $$A_{Z\_Coning} = A_{Cyclic} \sin(\omega_{coning} t + \phi_o) + A_{Bias}$$

wherein $A_{Cyclic}$ represents a constant acceleration amplitude that is proportional to a desired total angle of attack, $\omega_{coning}$ represents the coning angular frequency in (radians per second), t represents the time from start of the coning maneuver, $\phi_o$ represents the angle of the guidance on the y-z plane upon entry into the execution mode, $A_{Bias}$ represents an optional acceleration amplitude provided by the processor to provide an asymmetric biasing to the coning commands. Execution of the coning maneuver includes moving at least one control surface of the projectile to change the total angle of attack of projectile 130. Those skilled in the art will readily appreciate that the number of and position of control surfaces 140 can vary as needed depending on the airframe. Those skilled in the art will readily appreciate that onboard sensors can also be used to directly control an angle of attack.

The acceleration bias, $A_{Bias}$, provides steering capability during the coning acceleration command by varying the total angle of attack within a single revolution about the circular end of the cone, schematically shown by arrowheads between points B and C in FIG. 7. The asymmetric biasing command includes commanding cyclic movement of at least one control surface of the projectile.

$A_{Cyclic}$ is governed by the following equation:

$$A_{Cyclic} = \frac{C_N S_{Ref} \bar{q}}{MF}$$

wherein $C_N$ represents the normal force coefficient and is typically tabulated as a function of Mach number for a given projectile, $S_{Ref}$ represents a reference area of the projectile, MF represents the final mass of the projectile, and $\bar{q}$ represents the dynamic pressure. Those skilled in the art will readily appreciate that the $C_N$ value can be selected depending on the desired total angle of attack.

The angle of the guidance on the y-z plane upon entry into the execution mode, $\phi_o$, is governed by the following equation:

$$\varphi_o = \tan^{-1}\left(\frac{A_Z}{A_Y}\right)$$

wherein $A_Z$ represents an acceleration amplitude in the z-plane and $A_Y$ is an acceleration amplitude in the y-plane.

Figure 4:
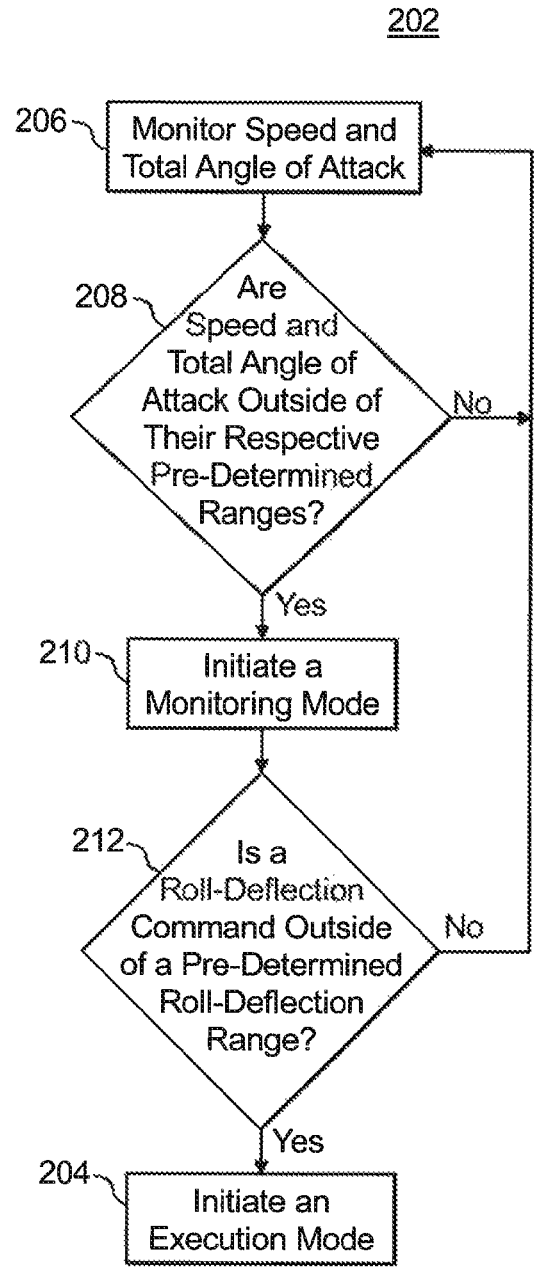
FIG. 4 is a flowchart of another aspect of controlling a projectile in accordance with the invention, showing operations for initiating the execution mode.

Now with reference to FIG. 4, determining if the roll control parameter is outside of the pre-determined operating range, operation 202, includes operations 206, 208, 210 and 212. Operation 206 includes monitoring a speed, for example, Mach number, and a total angle of attack of the projectile, e.g. using sensor data. Those skilled in the art will readily appreciate that there are a variety of suitable sensor sources in which operation 206 can draw data from. Operation 208 includes determining if the speed and total angle of attack are outside of a pre-determined speed range and a pre-determined total angle of attack range, respectively. Those skilled in the art will readily appreciate that the respective speed and total angle of attack pre-determined ranges can vary as needed for a given application, and generally are dependent upon the specific projectile airframe.

With continued reference to FIG. 4, if both the speed and the total angle of attack are outside of their respective pre-determined ranges, processor 110 begins operation 210. If not, processor 110 repeats operation 206. Operation 210 includes initiating a monitoring mode. The monitoring mode includes monitoring of a roll-deflection command Those skilled in the art will readily appreciate that the roll-deflection command, for example, is the amount of commanded rotation of canards 140 about their respective canard axis A in such a manner as to generate a control moment about projectile roll axis 170, shown in FIG. 1. Operation 212 includes determining if the roll-deflection command is outside of a pre-determined roll-deflection command range. If the roll-deflection command is outside of the pre-determined roll-deflection command range then the roll control authority parameter is determined to be outside of the operating range, indicating that the commanded roll-deflection is outside the airframe's physical capability due to aerodynamic interference with the tail, and processor begins operation 204. If the roll-deflection command is within the pre-determined roll-deflection command range then the roll control authority parameter is determined to be within the operating range, indicating that commanded roll-deflection is within the airframe's physical capability, and processor repeats operation 206.

Figure 5:
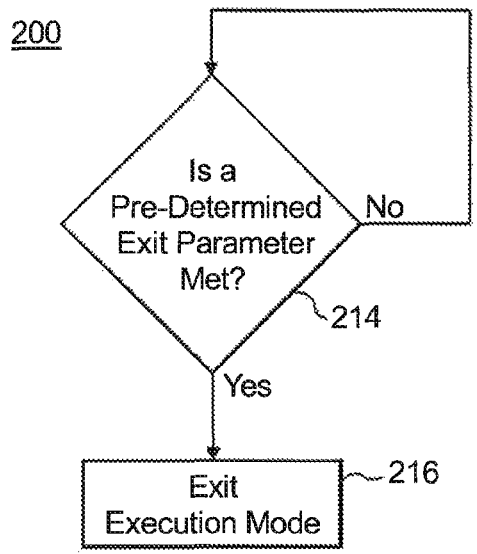
FIG. 5 is a flowchart of another aspect of controlling a projectile in accordance with the invention, showing operations for exiting the execution mode.

Now with reference to FIG. 5, once in execution mode, method 200 includes operations 214 and 216. Those skilled in the art will readily appreciate that operation 214 is run concurrently with any of operations 201, 203, and 207. Operation 214 includes determining if a pre-determined exit parameter is met. The pre-determined exit parameter, for example, can be set based on flight conditions for which adequate projectile roll control authority is expected. If the pre-determined exit parameter is met, processor begins operation 216 and exits the execution mode. Exiting the execution mode includes cancelling the modified command, including the asymmetric biasing command, and returning to the guidance command, therein ceasing operations 201, 203, and 207.

Figure 6:
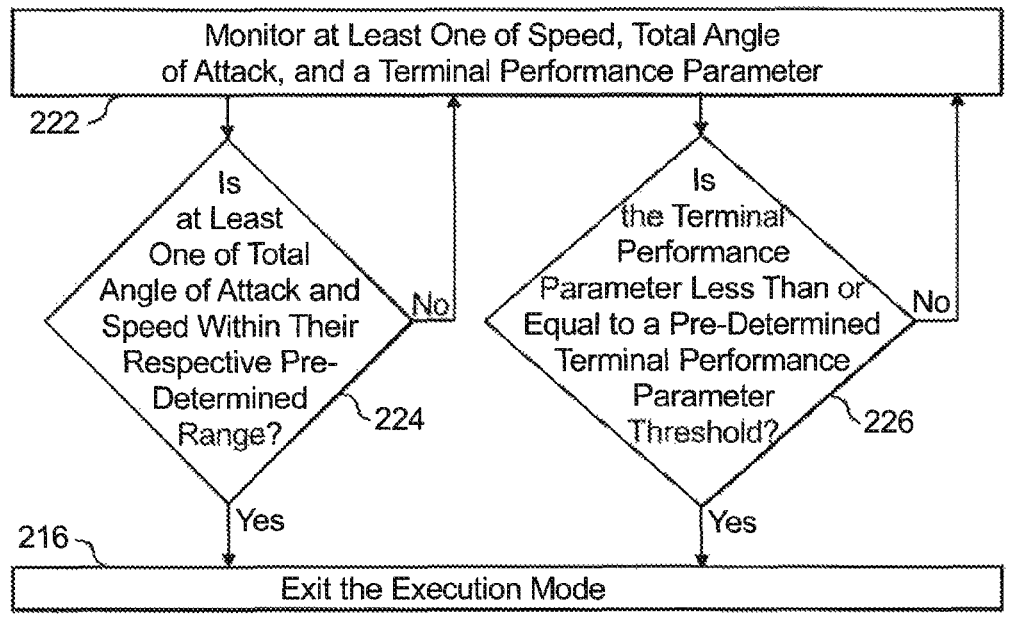
FIG. 6 is a flowchart of another aspect of controlling a projectile in accordance with the invention, showing operations for exiting the execution mode.

As shown in FIG. 6, operation 214 includes operations 222, 224 and 226. Operation 222 includes monitoring at least one of the speed, total angle of attack, and/or a terminal performance parameter, e.g. time-to-impact. Operation 224 includes determining if at least one of the total angle of attack and/or the speed is within a respective pre-determined range. Each respective pre-determined range is set based on the flight conditions for which adequate projectile roll control authority is expected. If at least one of the total angle of attack and the speed is within its respective pre-determined range then a pre-determined exit parameter is met, indicating that the roll control authority is within the airframe operating range, and processor begins operation 216 and exits the execution mode. Those skilled in the art will readily appreciate that, after exiting the execution mode, processor 110 can repeat operation 202.

With continued reference to FIG. 6, operation 226 includes determining if a terminal performance parameter, e.g. time-to-impact for the projectile, is less than or equal to a pre-determined terminal performance parameter threshold. If the terminal performance parameter is less than or equal to the pre-determined terminal performance parameter threshold then the pre-determined exit parameter is met and processor begins operation 216 and exits the execution mode to permit normal terminal guidance. This occurs regardless of the current flight conditions, such as speed or total angle of attack, to ensure that the projectile is not in execution mode, e.g. executing a coning maneuver, during terminal flight. Those skilled in the art will readily appreciate that operation 226 is relevant to those airframe configurations which are capable of maintaining a controlled trajectory even without positive roll control authority. For these airframes, retaining full terminal maneuverability can be more important than maintaining positive roll control for the final portion of flight.

Those skilled in the art will readily appreciate that addressing the induced roll moments on the tail fins by physically altering components of the projectile, such as the airframe, tail fins, and forward control surfaces, can be time consuming and costly. Embodiments disclosed herein may only require a modification to the flight control software read by a processor, in contrast with physical design change, therefore they can provide for improved controllability while being less time consuming and lower cost as compared to traditional physical alterations of the projectile.

The methods and systems of the present disclosure, as described above and shown in the drawings, provide for projectile control systems with superior properties including improved controllability at flight conditions for which significant aerodynamic interactions exist between forward control surfaces and tail fins. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A method of controlling a projectile, comprising:
    initiating an execution mode if a roll control authority parameter is outside of a pre-determined operating range for a projectile, wherein the execution mode includes bypassing a guidance command, and sending a modified command to execute a coning maneuver to improve control response of the projectile, wherein executing the coning maneuver includes moving at least one control surface of the projectile to change a total angle of attack of the projectile.

2. A method as recited in claim 1, wherein determining if the roll control authority parameter is outside of the pre-determined operating range includes:
    monitoring a speed and a total angle of attack of the projectile; and
    initiating a monitoring mode if both the speed and the total angle of attack are outside of respective pre-determined ranges, wherein the monitoring mode includes monitoring of a roll-deflection command and determining if the roll-deflection command is outside of a pre-determined roll-deflection command range, wherein if the roll-deflection command is outside of the pre-determined roll-deflection command range then the roll control authority parameter is outside of the pre-determined range.

3. A method as recited in claim 1, wherein the modified command includes a coning acceleration command.

4. A method as recited in claim 1, wherein the modified command includes an asymmetric biasing command for providing steering capabilities during the coning maneuver.

5. A method as recited in claim 4, wherein the asymmetric biasing command includes commanding cyclic movement of at least one control surface of the projectile.

6. A method as recited in claim 1, further comprising:
exiting the execution mode if a pre-determined exit parameter is met, wherein exiting the execution mode includes cancelling the modified command and returning to the guidance command.

7. A method as recited in claim 6, further comprising determining if at least one of a total angle of attack and a speed is within respective a pre-determined range, if at least one of the total angle of attack and the speed is within its respective pre-determined range then the pre-determined exit parameter is met.

8. A method as recited in claim 6, further comprising determining if a terminal performance parameter for the projectile is less than or equal to a pre-determined terminal performance parameter threshold, if the terminal performance parameter is less than or equal to the pre-determined terminal performance parameter threshold then the pre-determined exit parameter is met.

9. A projectile control system, comprising:
a processor operatively connected to a memory, wherein has instructions recorded thereon that, when read by the processor, cause the processor to:
initiate an execution mode if a roll control authority parameter is outside of a pre-determined operating range, wherein the execution mode includes bypassing a guidance command, and sending a modified command to execute a coning maneuver for improved control response of a projectile; and
a projectile operatively connected to the processor, wherein the projectile includes at least one control surface configured to rotate about its respective control surface axis to generate control forces and moments.

10. A projectile control system as recited in claim 9, wherein to determine if the roll control authority parameter is outside of the pre-determined operating range, the memory has instructions recorded thereon that, when read by the processor, cause the processor to:
monitor a speed and a total angle of attack of the projectile;
initiate a monitoring mode if both the speed and the total angle of attack are outside of respective pre-determined ranges, wherein the monitoring mode includes monitoring of a roll-deflection command and determining if the roll-deflection command is outside of a pre-determined roll-deflection command range, wherein if the roll-deflection command is outside of the pre-determined roll-deflection command range then the roll control authority parameter is outside of the pre-determined operating range.

11. A projectile control system as recited in claim 9, wherein the memory has instructions recorded thereon that, when read by the processor, cause the processor to:
determine if a pre-determined exit parameter is met; and
exit the execution mode if the pre-determined exit parameter is met, wherein exiting the execution mode includes cancelling the modified command and returning to the guidance command.

12. A projectile control system as recited in claim 11, wherein to determine if the pre-determined exit parameter is met, the memory has instructions recorded thereon that, when read by the processor, cause the processor to:
determine if at least one of a total angle of attack and/or a speed is within a respective pre-determined range, if at least one of the total angle of attack and the speed is within its respective pre-determined range then the pre-determined exit parameter is met.

13. A projectile control system as recited in claim 11, wherein to determine if the pre-determined exit parameter is met, the memory has instructions recorded thereon that, when read by the processor, cause the processor to:
determine if a terminal performance parameter for the projectile is less than or equal to a pre-determined terminal performance parameter threshold, if the terminal performance parameter is less than or equal to the pre-determined terminal performance parameter threshold then the pre-determined exit parameter is met.

* * * * *